(12) United States Patent
Nulman

(10) Patent No.: US 10,732,989 B2
(45) Date of Patent: Aug. 4, 2020

(54) METHOD FOR MANAGING DATA, IMAGING, AND INFORMATION COMPUTING IN SMART DEVICES

(71) Applicant: Wove, Inc., Palo Alto, CA (US)

(72) Inventor: Yanir Nulman, Palo Alto, CA (US)

(73) Assignee: Yanir Nulman, Palo Alto, CA (US)

(*) Notice: Subject to any disclaimer, the term of this patent is extended or adjusted under 35 U.S.C. 154(b) by 165 days.

(21) Appl. No.: 15/893,198

(22) Filed: Feb. 9, 2018

(65) Prior Publication Data
US 2018/0225127 A1    Aug. 9, 2018

Related U.S. Application Data

(60) Provisional application No. 62/457,030, filed on Feb. 9, 2017.

(51) Int. Cl.
| | |
|---|---|
| *G06F 9/46* | (2006.01) |
| *G06F 9/445* | (2018.01) |
| *H04L 29/06* | (2006.01) |
| *H04W 12/08* | (2009.01) |
| *G06F 21/54* | (2013.01) |

(Continued)

(52) U.S. Cl.
CPC ............. *G06F 9/445* (2013.01); *G06F 8/61* (2013.01); *G06F 21/54* (2013.01); *G06F 21/629* (2013.01); *H04L 63/0876* (2013.01); *H04W 12/08* (2013.01); *G06F 2221/2111* (2013.01); *G06T 17/20* (2013.01); *H04W 4/02* (2013.01); *H04W 12/00503* (2019.01)

(58) Field of Classification Search
CPC .......... G06F 9/445; G06F 21/629; G06F 8/61; G06F 21/54; G06F 2221/2111; H04W 12/08; H04W 12/00503; H04W 4/02; H04L 63/0876; G06T 17/20
See application file for complete search history.

(56) References Cited

U.S. PATENT DOCUMENTS 5,936,869 A * 8/1999 Sakaguchi ............. G06F 17/10
                                                345/423
6,130,673 A * 10/2000 Pulli ....................... G06T 17/30
                                                345/423

(Continued)

OTHER PUBLICATIONS

PCT/US2018/017651, International Search Report dated Jul. 2, 2018, 12 pages.

*Primary Examiner* — Adam Lee
(74) *Attorney, Agent, or Firm* — Patterson + Sheridan, LLP

(57) ABSTRACT

A smart device receives applications from locales wherein the application is useful only within the locale or a designated portion of the locale. The smart device includes a processor. The processor receives a signal indicating an application useful in a locale or a portion of the locale is available from a designated location, determines whether the device is authorized to download the application from the designated location, and if not, not download the application. If the device is authorized to download the application from the designated location, the processor determines whether the application is already stored in the device memory, and if so, runs the application when the smart device is in the designated portion of the locale, and if not, download the application from the designated location, and run the application when the smart device is in the locale or the designated portion of the locale.

9 Claims, 6 Drawing Sheets

(51) Int. Cl.
  *G06F 8/61* (2018.01)
  *G06F 21/62* (2013.01)
  *G06T 17/20* (2006.01)
  *H04W 4/02* (2018.01)
  *H04W 12/00* (2009.01)

(56) References Cited

U.S. PATENT DOCUMENTS

| | | | | |
|---|---|---|---|---|
| 6,549,288 | B1* | 4/2003 | Migdal | G01B 11/25 356/601 |
| 7,900,823 | B1* | 3/2011 | Knouff | G06Q 20/042 235/379 |
| 7,991,837 | B1* | 8/2011 | Tahan | G06F 3/0481 348/240.3 |
| 9,928,655 | B1* | 3/2018 | Alston | G06T 19/006 |
| 9,992,327 | B1* | 6/2018 | Sharifi Mehr | H04M 1/72577 |
| 10,121,279 | B1* | 11/2018 | Sundaram | G06T 15/20 |
| 2002/0050988 | A1* | 5/2002 | Petrov | G06K 9/20 345/418 |
| 2005/0033142 | A1* | 2/2005 | Madden | A61B 5/0059 600/407 |
| 2007/0204039 | A1 | 8/2007 | Inamdar | |
| 2009/0119468 | A1* | 5/2009 | Taylor | G06F 21/554 711/166 |
| 2010/0080410 | A1* | 4/2010 | Deluca | G06F 21/6245 382/100 |
| 2010/0141662 | A1* | 6/2010 | Storey | G06T 13/40 345/473 |
| 2010/0156920 | A1* | 6/2010 | Shin | G06T 15/04 345/582 |
| 2010/0310116 | A1* | 12/2010 | Sasakawa | G01W 1/12 382/100 |
| 2011/0007958 | A1* | 1/2011 | Salomon | G06T 11/005 382/131 |
| 2011/0069866 | A1* | 3/2011 | Kim | G06K 9/00369 382/103 |
| 2011/0159921 | A1 | 6/2011 | Davis et al. | |
| 2012/0014672 | A1* | 1/2012 | Kasuya | G11B 27/034 386/281 |
| 2012/0239359 | A1* | 9/2012 | Furuya | G06F 17/5018 703/2 |
| 2012/0309409 | A1 | 12/2012 | Grosman et al. | |
| 2013/0093897 | A1* | 4/2013 | Fan | H04N 7/181 348/159 |
| 2013/0207966 | A1* | 8/2013 | Chu | G06T 17/00 345/419 |
| 2013/0305383 | A1* | 11/2013 | Garralda | G06Q 30/00 726/26 |
| 2014/0095587 | A1* | 4/2014 | Schult | G06F 3/1242 709/203 |
| 2014/0152660 | A1* | 6/2014 | Lee | G06T 19/20 345/420 |
| 2014/0152877 | A1* | 6/2014 | Honsho | G03B 15/00 348/239 |
| 2014/0187256 | A1* | 7/2014 | Modali | H04W 4/027 455/456.1 |
| 2014/0267031 | A1* | 9/2014 | Huebner | G06F 3/0346 345/158 |
| 2014/0297787 | A1 | 10/2014 | Baugh et al. | |
| 2014/0337123 | A1 | 11/2014 | Nuernberg et al. | |
| 2014/0344061 | A1 | 11/2014 | Choi et al. | |
| 2014/0375628 | A1* | 12/2014 | Saito | G06T 13/40 345/419 |
| 2015/0002663 | A1* | 1/2015 | Pan | H04N 5/23229 348/142 |
| 2015/0016733 | A1* | 1/2015 | Park | G06K 9/00912 382/218 |
| 2015/0039269 | A1* | 2/2015 | Mejegard | G06Q 10/06 702/182 |
| 2015/0089673 | A1* | 3/2015 | Beckman | H04L 63/105 726/29 |
| 2015/0104006 | A1* | 4/2015 | Holman | G06F 21/6209 380/28 |
| 2015/0104080 | A1* | 4/2015 | Holman | G06Q 50/184 382/115 |
| 2015/0154417 | A1* | 6/2015 | Pasumarthi | G06F 21/6218 726/30 |
| 2015/0177906 | A1* | 6/2015 | Yairi | G06T 3/0006 345/648 |
| 2015/0243069 | A1* | 8/2015 | Knoblauch | G06T 5/003 345/420 |
| 2015/0350827 | A1* | 12/2015 | Birch | H04W 4/02 455/456.1 |
| 2016/0004850 | A1* | 1/2016 | Jayaraman | G06F 12/1483 711/163 |
| 2016/0019360 | A1* | 1/2016 | Pahwa | G06F 19/3418 705/3 |
| 2016/0048944 | A1* | 2/2016 | Ashmole | A61B 6/032 382/131 |
| 2016/0088284 | A1* | 3/2016 | Sareen | G06N 3/006 348/47 |
| 2016/0100438 | A1* | 4/2016 | Ursitti | H04W 4/21 455/456.3 |
| 2016/0187982 | A1* | 6/2016 | Ciesla | G06F 3/04886 345/173 |
| 2016/0203522 | A1* | 7/2016 | Shiffert | G06Q 30/0267 705/14.58 |
| 2016/0259049 | A1* | 9/2016 | Proctor | G01S 7/521 |
| 2016/0353056 | A1* | 12/2016 | Cullen | H04N 7/147 |
| 2016/0354057 | A1* | 12/2016 | Hansen | A61B 8/483 |
| 2016/0360970 | A1* | 12/2016 | Tzvieli | G01J 5/0265 |
| 2016/0364881 | A1* | 12/2016 | Mallinson | G06T 7/20 |
| 2016/0379083 | A1* | 12/2016 | Sala | G06T 7/75 345/633 |
| 2017/0011538 | A1* | 1/2017 | Singh | G06F 3/147 |
| 2017/0013247 | A1* | 1/2017 | Kim | H04N 13/194 |
| 2017/0018121 | A1* | 1/2017 | Lawson | G06T 3/0093 |
| 2017/0045941 | A1* | 2/2017 | Tokubo | G06F 3/167 |
| 2017/0048666 | A1* | 2/2017 | Choi | H04W 4/021 |
| 2017/0084074 | A1* | 3/2017 | Hwang | G06T 15/205 |
| 2017/0131896 | A1* | 5/2017 | Park | G06F 3/04883 |
| 2017/0161947 | A1* | 6/2017 | Lindahl | G06T 17/205 |
| 2017/0180637 | A1* | 6/2017 | Lautenbach | H04N 5/23222 |
| 2017/0223338 | A1* | 8/2017 | Kang | G06T 7/80 |
| 2017/0236466 | A1* | 8/2017 | Spitzer | G09G 3/2085 345/560 |
| 2017/0287107 | A1* | 10/2017 | Forutanpour | G06T 3/0062 |
| 2017/0344807 | A1* | 11/2017 | Jillela | G06K 9/00255 |
| 2017/0365096 | A1* | 12/2017 | Grenfell | G06T 15/08 |
| 2017/0374342 | A1* | 12/2017 | Zhao | G01B 11/2518 |
| 2018/0061010 | A1* | 3/2018 | Akselrod | G06K 9/00228 |
| 2018/0136720 | A1* | 5/2018 | Spitzer | G06F 3/013 |
| 2018/0144547 | A1* | 5/2018 | Shakib | G06T 19/003 |
| 2018/0189369 | A1* | 7/2018 | Baek | G06F 16/27 |
| 2018/0196509 | A1* | 7/2018 | Trail | G02B 27/0093 |
| 2018/0240244 | A1* | 8/2018 | Uyyala | G06T 17/10 |
| 2018/0288566 | A1* | 10/2018 | Lu | H04L 67/18 |
| 2018/0365800 | A1* | 12/2018 | Suzuki | G06T 3/40 |

\* cited by examiner

METHOD FOR MANAGING DATA, IMAGING, AND INFORMATION COMPUTING IN SMART DEVICES

FIELD

The present disclosure relates to the field of smart devices, more particularly to smart devices used to implement augmented, mixed or augmented and mixed reality capabilities.

BACKGROUND

The advent of smart devices such as smartphones, tablets, wearables, smartwatches, headsets, virtual reality headsets, augmented reality headsets, mixed reality headsets, etc., and their software, have created a demand for increased computational power which cannot currently be met by current processing technologies. Furthermore, current smart devices require placement at a physical location on a person's body, which can become unnatural, distracting, and rude to the view of others.

Additionally, as a result of recent developments in augmented and mixed reality technology for use in portable devices, such as smartphones, headsets such as virtual reality headsets, smart glasses, and the like, there has arisen a critical need for miniaturized portable hardware capable of storing greater quantities of data and capable of processing the large quantity of data generated and used by these portable devices than is currently available. For example, a smart phone can be used to view, through the camera thereof, a space, and also overlay, into the viewed spaced, digital images. These digital images are rendered from the memory of the smart phone, or are received by the smart phone through a wireless or cellular interface, and then processed and rendered into the viewed overlayed image. Currently, these uses of smart devices, except for smart phones. are in the early adopter stage, where only a limited number of users in a wireless or cellular environment are using the technology. However, in the near future it is anticipated that a much larger number of users will be using this technology, and simultaneously using it in the same immediate area, and each device of each user in the same immediate area will be accessing the same local wireless or the same cellular system at the specific location for data and images, or, each users' device will require a very large storage capability which is preloaded with image information used by the smart device. In many cases, an application required to access this content is operable only at a specific location, and it cannot be accessed remote from that location. If a user is intending to engage interactively with another user, then the interactively engaging users must engage with one another in either a hard wired, or wireless/cellular, way. As a result, the user's device requires storage capacity which is not practical today, or bandwidth that is not obtainable once a number on devices are demanding access and bandwidth from the same source. Additionally, even where the device has a large data storage capacity, that capacity is also used to store specific functionality application programs and data for other functionalities of the device, and in use, the user will often add additional data and functionalities for a limited use, for example, an immediate use by the device to deliver information or content to the device at the user's request, but the data and functionality will remain in the data store of the device thereafter taking up data storage space therein. These application programs are opened by an interface of the user's device, which is typically an icon on a touch screen, and as a result a device as the user add additional data and functionalities for a limited use, the touch screen will become cluttered with a number of interfaces, or, the device will have a master interface for accessing these specific functionality application programs. For example, the device home screen may display all pre-installed applications that are available for the smart device's users to access. This solution requires using the storage capacity of the device to store the application in preparation for use even if the application is not going to be used in the near future.

Furthermore, smart devices such as head mounted wearable devices (smart glasses, virtual reality headsets, mixed reality headsets, smart sunglasses, augmented reality headsets, etc.) block off portions of the body, i.e., block certain body parts such as the head, the face, or portions thereof when used, of the users of these devices, from being viewed in images taken from cameras and smart devices of others, and from images of other head mounted wearable device users. Certain body parts such as the face are crucial for personal interactions between people, and when obstructed, can be perceived as rudeness to surrounding people and other users interacting with the user having the blocked body part. For example, people that are wearing virtual reality headsets which completely cover the eyes appear disoriented and unrecognizable in photographs or camera images appearing on another user's device, including another users augmented reality headset. Current image capturing devices, and the image generation system of the device which displays the captured image enhance people, do not "edit out" or enhance the smart device on, or worn by, the user that is visible in the view. Current imaging capturing devices, and the image generation system of the device which displays the captured image, do not overlay an image of a body part such a face on a body image on smart devices where the body part is blocked from view.

Also, there is a critical need for miniaturized portable hardware capable of processing the large amounts of data generated and used by these portable devices. For example, a smart phone can be used to view, through the camera, a space, and also overlay, into the viewed spaced, digital images. These digital images are rendered from the memory of the smart phone, or are received through a wireless or cellular interface, and then processed and rendered into the viewed image. Currently, processing technologies struggle to render high quality, high accuracy digital images, as well as large quantities of digital images, and all images received through the camera/lens of the device at the device image refresh rate are digitally processed regardless of whether or not they are being viewed, which takes up, and thus limits, the processing power needed to process other applications, such as augmented reality content to be displayed in an image on a screen or display. Furthermore, in the near future, the need for faster refresh rates and attendant greater processing and rendering of digital images will arise.

Further, the increase in demand for 3D, stereoscopic displays has presented a struggle to create and replay 3D content and models. Currently, capturing images and creating a multidimensional (3D) model of an object or person requires technology, particularly scanning technology that is inaccessible on a day to day basis. Some capturing devices include a multi-camera rig that takes pictures from various angles and focal lengths. These rigs are typically stationary and fixed in size. Standalone, portable 3D scanning devices also require precise movements, scanning time, and processing time. In the near future, virtual, augmented, and mixed reality will create the need for faster and intuitive methods to create 3D models that can be displayed later.

Further, the online shopping experience using smart devices does not allow shoppers to interact with the products or a representation of the products they are buying before purchasing. Shopping interfaces are limited to 2D UIs which include images, videos, or other media of product offerings. The style of the online interfaces is a list, or scrollable view of the product offerings. These interface styles do not parallel the experience that shoppers would be able to get at a physical retail store.

SUMMARY

Herein, an alternative framework to manage the storage and computing power limitations of portable devices such as smartphones, mobile headsets for virtual, mixed, and augmented reality, laptops, etc. by providing a universal application (app) interface to temporarily store apps that enables the user to designate availability when in a local environment to allow applications specific to that location to be downloaded thereto and thus accessible by the user in the specific location is provided. When the user, having been in a location where additional data and functionalities for a limited use was downloaded by a user to the user device for use in than specific location leaves that location, the applications specific to the location are "erased" from the smart device memory. As a result, the user's smart device does not become overloaded with application software and data for applications that cannot be operated when the user is in a different location.

Additionally, where a user of a smart device which blocks a body part is viewed through another user's smart device, here the viewing device, if the viewing device's user has allowed for the artificial removal of the obstructing device from the image, the viewing device will request access to visual data about the owner of the body part obstructing smart device. The viewing device can request this information directly from the obstructing device or from a communication platform on an external server. If the obstructing device's user has allowed for the transfer of the visual data, the data is sent to the viewing device from the obstructing device or from the external communication server. The viewing device then uses the visual data to overlay and blend an image of the obstructed portion of the obstructing device user's body onto the area where the obstructing device is present and obstructing and into the augmented reality or other scene being viewed by the viewing user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In operation, the smart device can be preprogrammed by the user to authorize acceptance of application data from a specifically identified application program which can be downloaded to the user's device as an app, where the application program is available wirelessly only within a specific geo fence. When the smart device is in the proximity (within the geo fence) of a specific location where an application is available by wireless or cellular broadcast, the application, if authorized to be accepted by the user as a specifically identified application, will be automatically downloaded and displayed on the smart device as a user selectable icon or by other user selection capabilities. The geo-fenced area can be specified by the developer of an application or determined based on the amount of data needed to be transmitted/downloaded/installed, or, the user can specify, prior to arriving at the location, the possible area within the geo fence in which a specifically identified application may be downloaded. This downloaded application can be permanently stored on the device into which it was downloaded, or uninstalled at an instance specified by the user or by the provider. For example, the user can uninstall the app which allowed the provider to automatically download the local content useful in within the geo-fence area to the user's smart device, thereby preventing future downloading of the specific application unless the app is again installed, modify the app settings to disallow the application from being downloaded thereby preventing future downloading of the specific application, establish settings to erase the application based on a change in location of the smart device, or manually erase the application. Optionally, where the application is erased, it may be revived, if not yet overridden in the device memory, when the smart device reenters the geo-fence or the limited geo-fence region specified by the user, thereby not requiring re-downloading thereof from the specific location's wireless or cellular system. Such an instance could be based on a specific time or specified passing of time, specific location, of the user device, a combination of both, or determined by the device system or developer. However, the user device operating system or the application developer can preserve the user-specific application account data for future use, preferably in the operating system of the user device. In addition to specific locations, apps can be assigned to specific objects that can be identified around a person. For example, if a person is sitting at a desk, certain applications can be assigned to the desk, but also other desks in other rooms, or to other smart devices which will not be location specific. Similarly, apps can be downloaded and loaded by another trigger, such as a user action or activity being detected by the smart device, for example, detecting when a person begins or stops running, etc.

Figure 1:
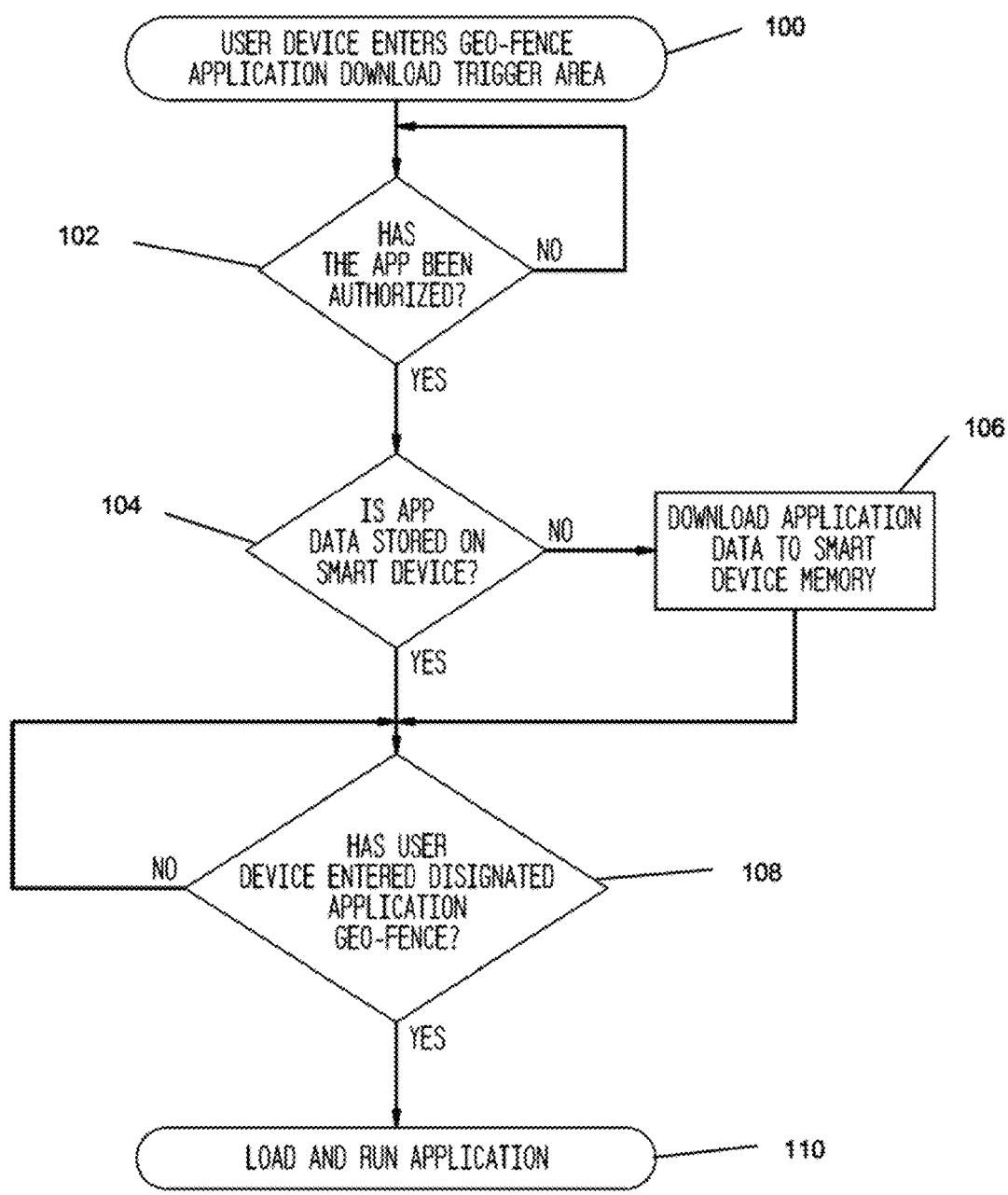
FIG. 1 is a flow diagram of a methodology for determining whether to download an available application.

Referring to FIG. 1, an example of the operation of the smart device, including the processor, memory, and communication device thereof, is shown. In act 100, a user carrying a smart device, and thus the device itself, enters into a geo-fence application download trigger area, where the local area network (LAN) is broadcasting availability of an application useful within the boundaries of the geo-fence. The smart device determines whether the application has been authorized; by for example the user thereof, to be downloaded thereto, act 102. If the downloading of the application is not authorized, No in FIG. 1, the smart device does not download the application. If the downloading of the application is authorized, the smart device determines whether the application, i.e., the application data, is stored in the memory of the smart device, for example the cache memory thereof, and if not, proceeds to download the application data thereto in Act 106. If the application data was in the memory of the smart device, or if not, once it is downloaded to the smart device, the smart device then determines whether the smart device is within a designated area of the geo-fence for use of the application in Act 108, and if so, loads and runs the application in Act 110. If the user has not entered the designated area in the geo-fence for use of the application, No in act 108, the smart device again determines whether the user has entered the designated area for use of the application in Act 108. Repeating of Act 108 may be based on the passage of time from the last execution of Act 108, or the receipt of a trigger signal from the LAN that the appropriate area within the geo-fence for use of the application has been entered. Maintenance, i.e., continued storage, of the application and the attendant data on the smart device are preferably prioritized, whereby applications and data can be assigned to at least three categories: Maintained unless manually erased, always erase, i.e., allow the memory in which they are stored to be overwritten, and maintain if the memory space in which they are stored is not needed to optimally, as defined by the user, operate. In each category, the user or operating system may specify the application maintenance priorities. In the third category, the applications and data may be stored in an overwritable cache, wherein the user or operating system can set the priority for overwriting. For example, where an application is always operated within a geo-fence where the application is provided over a specific location provider local transmitter such that no cellular service is involved, the user is likely to specify that the application be "erased". On the other hand, applications which the user is likely to reuse and which are also received by a cellular connection will be likely moved to the overwritable cache. The overwritable memory, such as a cache memory, can be configured to overwrite the oldest data first. Thus, where a user inadvertently, or purposely, moves in and out of the geo-fence within which the application is accessible in a short period of time, the smart device will likely still have the application and most recent data therein still available in cache, from which it can be retrieved upon reentering the geo-fence.

By having a trigger such as an object, action, or location cause an application to install and run, the user device does not need to store extensive application data and can allow for other applications to use the data storage space of the smart device. If necessary, only user Meta data is stored at the user's own choice or stored at the service provider, if such a capability is offered and at the user's own selection. In addition, the trigger decreases the number of interactions a user needs to download a relevant app. In this case, the application will be downloaded because it is deemed relevant to the user by the trigger.

Figure 2:
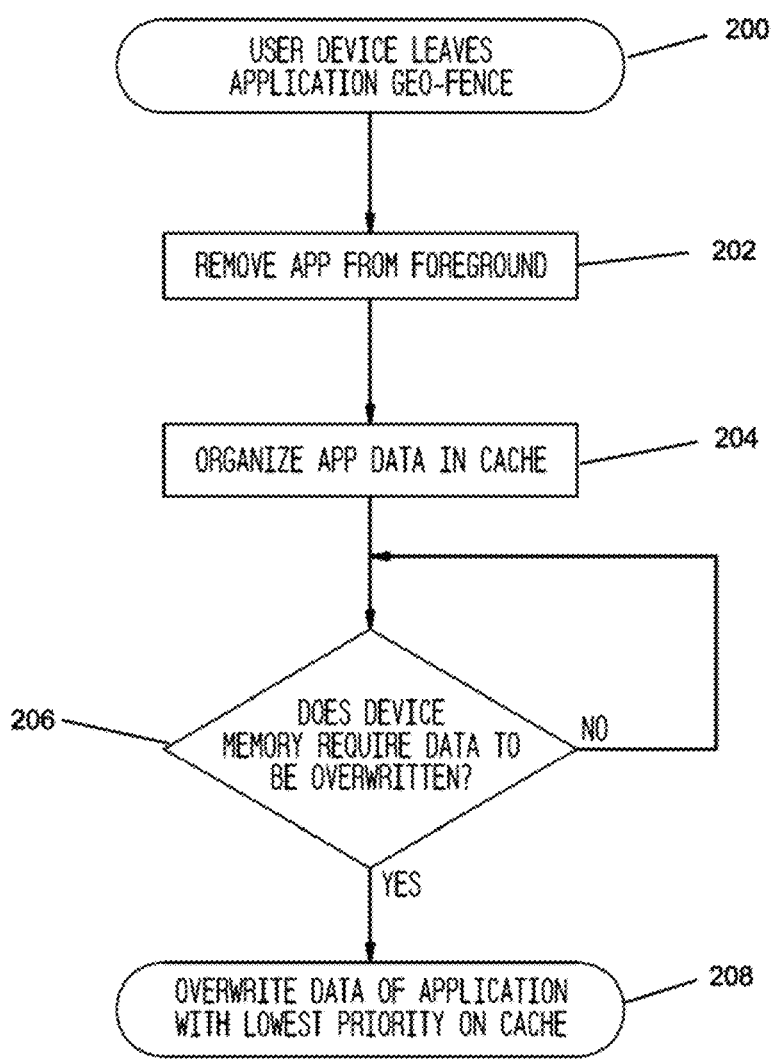
FIG. 2 is a flow diagram of a methodology for determining whether to locate a downloaded application in a rewritable memory application.

Referring to FIG. 2, once the user device leaves the application geofence, Act 200, if the device has not been authorized by the user to maintain the application in memory, the user device removes the application from the from the foreground, Act 202, such as by removing an icon relating thereto from the device screen, and then sets the application into the cache memory by organizing thereinto based on priority of potential reuse. Act 204. Then, during use of the smart device, the smart device determines whether device data to be stored, or the use of the device, requires that data in the cache needs to be overwritten, ACT 206. If it does, YES in Act 206, the data in the cache is overwritten, wherein the data having the lowest priority is overwritten first. is allowed to be overwritten.

Thus, by organizing downloaded applications (apps), including those useful only is a specific locale, in the smart device memory based on a user designated priority, the operation speed and capability of the smart device can be maintained despite the user using multiple geofence specific applications over time. Additionally, by setting the overwriting, or the maintenance, priority based on the users perceived need to again use the application, frequency of use of the application, or likely order in which downloaded applications will again be used, the user of the device will perceive a minimum impact on their use of the device. In many cases, depending on the device memory capacity, and the frequency of downloading of, and the memory required for, different the downloaded applications, the application frequently used will have an overwrite status in the device memory, but, because the overwrite priority assigned to the application is low, or the maintenance priority to maintain the application is high, it will remain in memory and will be available as soon as the user enters the geofence therefor, and the time required to download and execute the application on the device is eliminated, resulting in enhanced user experience.

To address the issue of images of an individual wearing a smart device such as an augmented reality headset including the image of the smart device, a framework is provided herein for smart device owners to be viewed in media, i.e., in augmented reality on another users device and in real time as if a device that is blocking part of the person's body from view is removed from view. Using computer vision recognition, a viewing device can detect when an obstruction is in the view of the viewing device, or can also be informed by an outside source such as the obstruction, for example an obstructing smart device or an external communication platform that communicates therewith, that there is a device obstructing the view of a person's body within an image. The external communication platform can coordinate between the two smart devices based on relative location and field of view of the user device to the person being viewed. If the viewing device's user has allowed for the artificial removal of the obstructing device from the image, the viewing device will request access to visual data about the owner of the body part obstructing smart device. The viewing device can request this information directly from the obstructing device or from a communication platform on an external server. If the obstructing device's user has allowed for the transfer of the visual data, the data is sent to the viewing device from the obstructing device or from the external communication server. The viewing device then uses the visual data to overlay and blend an image of the obstructed portion of the obstructing device user's body onto the area where the obstructing device is present and obstructing and into the augmented reality or other scene being viewed by the viewing user.

The visual data transmitted includes a general 3D model of the owner of the obstructing device. This data can be enhanced by additional information from the obstructing device and the viewing device. If the obstructing device is, for example, covering part or all of the user thereof's face, and it has access to the pupil color and gaze direction of that user's eyes, that information can also be included in the 3D model. If the obstructing device has the proper sensors onboard, facial structure such as smiling and frowning can be added to the 3D model. Additionally, environment conditions such as lighting can be used to blend the 3D model into the viewer's scene. If the additional data is not accessible, the data can be generated using artificial intelligence and computer graphics which adapt based on obstructing device owner's information.

Once the information is received it is overlaid over a generic model where animation and natural behaviors are embedded enabling a view of the obstructed part of the other user with its expression and movement.

The framework can be implemented for still images, moving video, live media, or other media.

For example, a token or other identification mechanism for the person being viewed can be present on the user, or for example, in the smart device obstructing the body part. This token can be sensed by the smart device through which the obstructed user is viewed, or through a wireless LAN or other detection system connected to a storage holding an image of the individual owner of the token, which can identify the person having the body part obstructed. In either case, the image information is then used to generate, in the image of the individual having the body part blocked viewed by the user.

Figure 3:
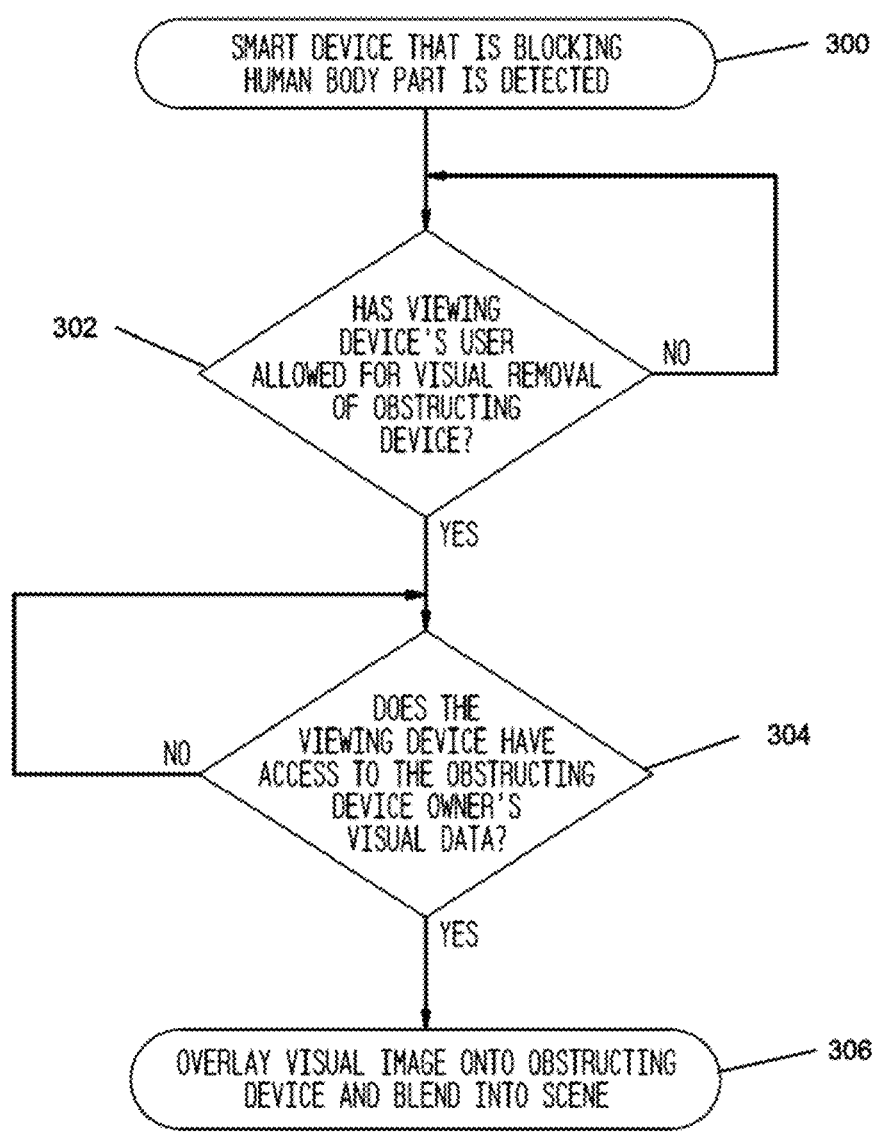
FIG. 3 is a flow diagram of a methodology for overlaying an image of a portion of a person over 100 an image of that person, where a portion of the person in the image is blocked.

Referring to FIG. 3, when a user's smart device detect a person wherein a smart device is blocking a part of their body, ACT 300, the users device determines whether the device blocking a part of the body of the other user allows for virtual removal of the obstructing device by the users device, ACT 102. If NO, this processing stops. If yes, in a\ACT 304, the users device determines if it has access to the owner of the obstructing device's visual data, i.e., an image of their face or the portion thereof blocked by the device, ACT 304. If NO, this processing ends. If yes, the user's device displays the image of the owner over the obstructing device in the image it displays.

By overlaying a person's body part onto their device in pictures or through a display, the image of the person wearing the device will look more natural to others viewing them through another device and this preserves social conventions, such as those occurring during conversation, without the need to use and/or transmit large amounts of data to one or both of the obstructed users device or the viewing users device. This will further facilitate the use of naturally looking avatars in computer driven real time interactions.

To address limitations in current processing power of portable devices being used to display camera/lens images, and simultaneously process additional information such as rendering of augmented reality content on the same image, a system is provided which ameliorates the current limitations of computational power in a device by learning the tendencies and status of a smart device user and distributing computing power based on that collective information. The system collects data about the areas in a view where an individual is looking. This information includes what object is being viewed, and which parts of the object are being focused on at the moment, as well as over time, as well as details about the object such as color and orientation. The system can also simultaneously collect data about the individual's status such as their physical activity, mental state, eyelid status, and schedule/notifications. The system collects such data based on motion sensors, eye trackers, cameras, and computer vision technologies on the smart device. The combination of data is used to build a library of what the individual focuses on in a view, how the focus moves based on user status as well as on the user field of view the or that in the fovial view in the user field of view.

The system can use the library of data and current data about the individual to predict the fovial view of a user in different digital images, what specific subsections of the digital image will be in the fovial view, and how the fovial view, i.e., the direction of the eye, will move. The prediction can be used to allocate computational power to render the areas of the digital images in which the fovial view of the individual is predicted to be directed, thereby dedicating more of the limited computational resources of the device to the expected area of the image to be in the fovial view and thereby creating a more detailed, a more frequently updated, or a more detailed and more frequently updated, image in that area. The system is tailored to the individual user of the device on which the images are displayed, to learn the viewing preferences of the individual and to be able to dynamically react to the individual using a prediction of the next area of the display to be in the fovial gaze of the user.

By predicting where the foveal gaze and attention of the user will be with respect to the display or screen, and the importance of the quality of the images to be displayed, the processor can prioritize where to increase and decrease the quality of an image, 3D model, or image and 3D model generated and rendered, thus reducing the amount of required computational power and data density required to display an image to a user which appears more natural in the area of the image the user is viewing, is next predicted to view, or is viewing and is next predicted to view.

Figure 4:
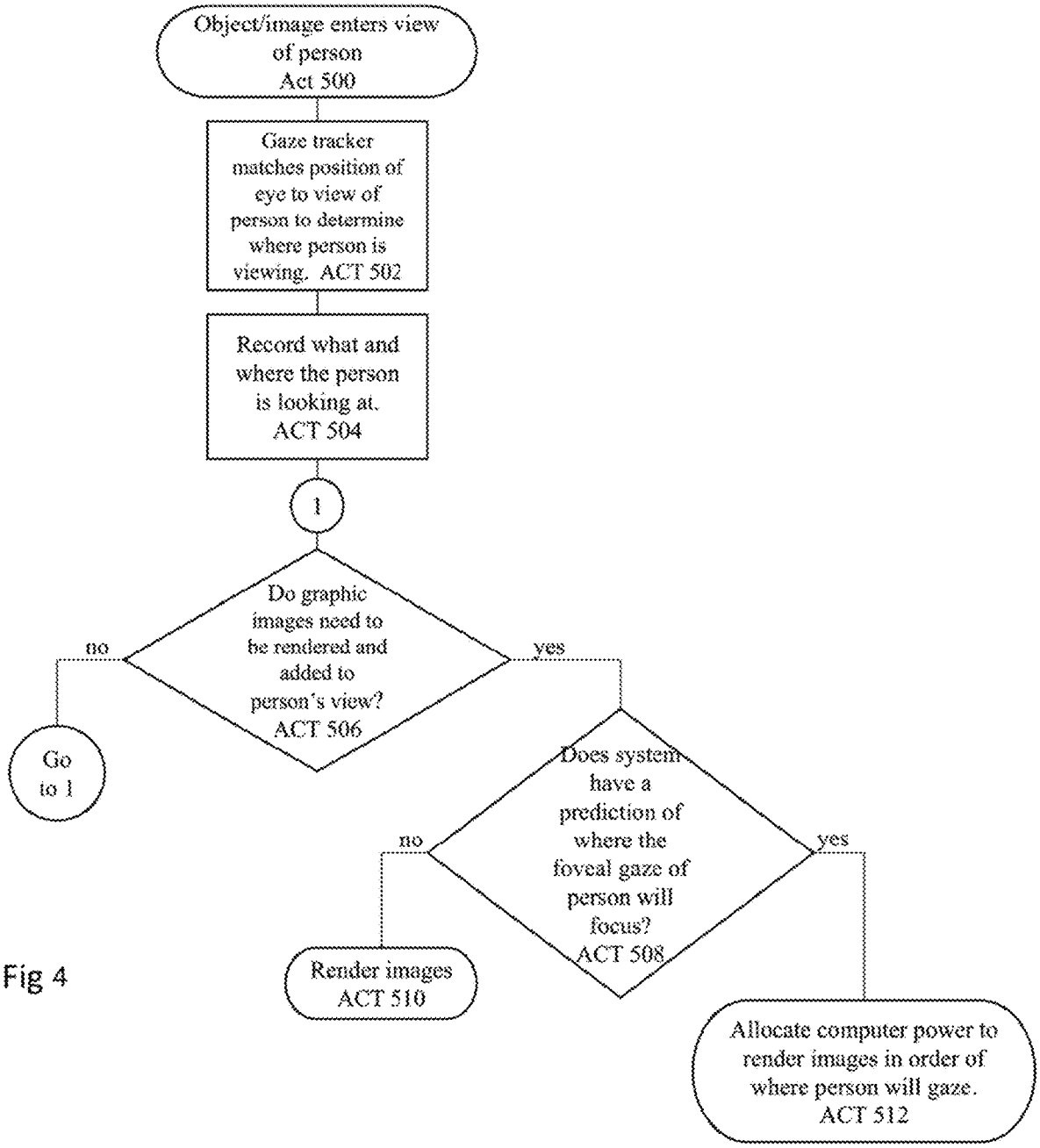
FIG. 4 is a flow diagram of a methodology for determining where, in a displayed image, to render a graphical image.

Referring to FIG. 4, when an object or image enters a person's field of view, ACT 500, the gaze tracker matches the position of a user's eye to the position of an object or person to determine where or what the user is viewing, ACT 502. Then the processor of the system records what the user is looking at, and where they are looking, ACT 504. The processor, based on the record of what the user is looking at, and where they are looking, determines whether graphic images should be rendered and added to the users view, ACT 506. If a determination is made not to render graphical images, the processor returns to the result of the ACT 504. If a determination to render graphical images is made, then the processor determines whether the system has a prediction of where the fovial gaze of the user will focus, ACT 508. If no prediction is present, images are rendered, ACT 510. If a prediction is present, the processes allocated processor power, i.e., computing power, to render images in the order of where the system predicts the user will gaze. Herein, a framework that provides an accessible ability to capture, maintain, and then use/view a 2D and 3D image is provided. Using computer vision and recognition, the capturing smart device can assign a general 3D mesh to the object that is being scanned. As the capturing device views the scanned object, it adds 2D and/or 3D image data to the corresponding locations of the mesh. The 3D mesh specific to the scanned object can then be stored on the capturing device or on an external server. When another capturing device scans the scanned object subsequent times after the initial scanning, it applies the additional data to the existing mesh and updates mesh to increase accuracy and status of the object.

The 3D mesh can then be played back in 2D or 3D still, moving, and real time media. As the scanned object is recorded changing position or appearance, the mesh can be adjusted to replicate the position/appearance in real time. Applying captures to a generalized mesh of an object, the subject can be scanned and captured in 3D with limited capturing hardware and time.

Figure 5:
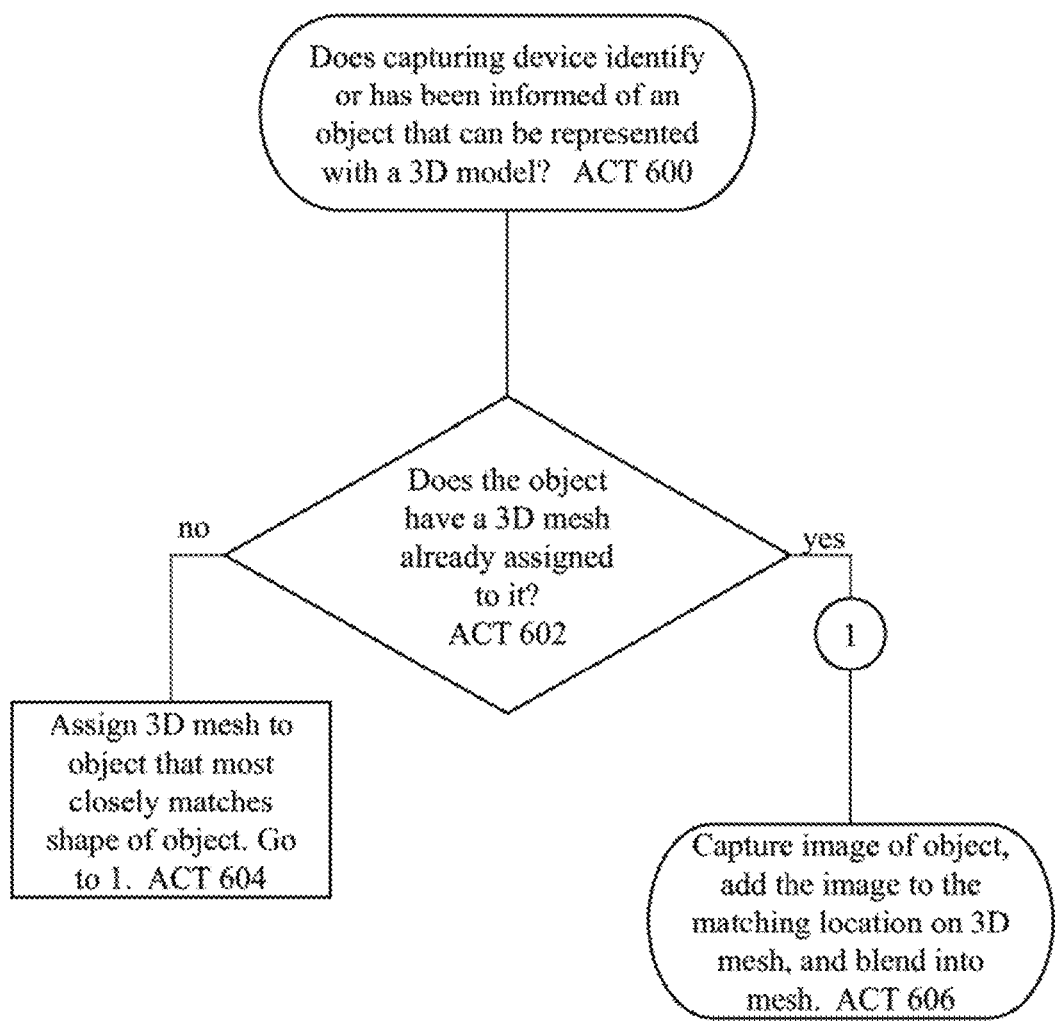
FIG. 5 is a flow diagram of a methodology for setting an image in a 3D mesh.

Referring to FIG. 5, a capturing device, such as a graphics processor receiving images captured by a camera, first reviews objects and receives inputs, and determines if an object captured by the camera or of which the processor has been informed can be represented as a 3D scale model, Act 600. If so, the processor determines whether the object has been previously assigned a 3D mesh, ACT 602, and if not, assign a 3D mesh to the object that most closely matches the shape of the object, ACT 604. If a 3D mesh was previously assigned to the object, the processor captures the image of the object in a memory, and adds the image to the matching location of the 3D mesh and blends it into the mesh, ACT 606

Herein a 3D digital interface for viewing, selecting, and making online purchases is provided. The interface constitutes a physical dimension in real space and includes 3D scale representations of the product offerings that a shopper can view from different angles and interact with. The shape of the interface can constitute different styles of shops such as coat racks, kiosks, shelves, etc. The shape and design of the "store" is determined by the retailer and the physical restrictions of the space of the buyer. The product offering and scale is also determined by the retailer.

A 3D store can match the experience of a physical retail store, but do so in spaces where the shopper is rather than where the store is.

Figure 6:
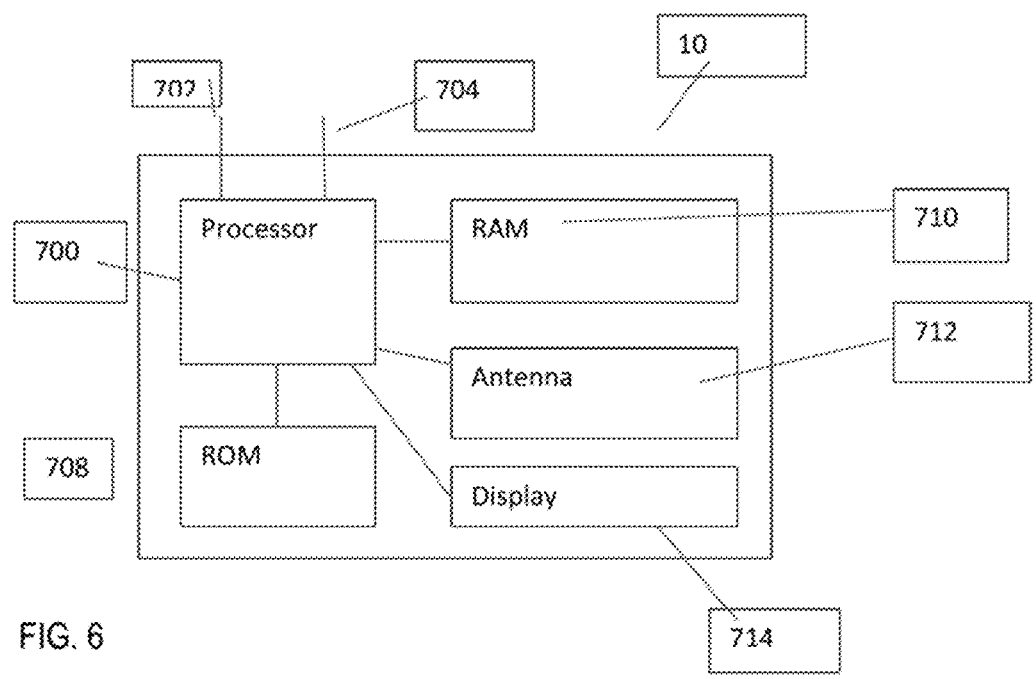
FIG. 6 is a schematic view of a processing circuit of a smart device.

Referring now to FIG. 6, a schematic of the processing portion of a device hereof is shown. Device 10 includes a microelectronic processor 700 for performing arithmetic calculations and receiving external inputs on input terminal 702, and generating external outputs over output terminal 704. Processor 700 is connected to a read only memory (ROM) 708, a random access memory (RAM) 712, an antenna 712 and a display 714.

Figure 7:
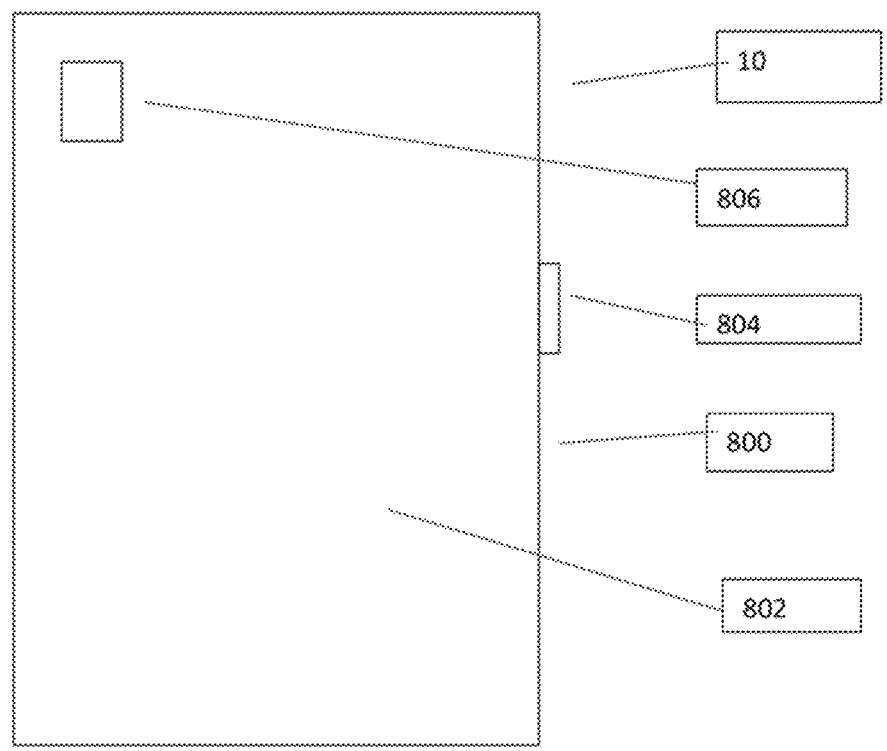
FIG. 7 is a schematic representation of a smart device.

In use, operating software for the operation of the functions of the processor 700 are stored in the ROM 708, and programs used intermittently, such as those downloaded to the device 10 via the antenna 712, and memory required to store data generated by these programs, is stored in the RAM after being received by the processor through the antenna. The processor, which includes a graphics processor integrally or separately provided, therewith, renders images on the display FIG. 7 is a schematic representation of a the viewable portion of a smart device 10. Device 10 includes a casing 800, a screen 802, an on/off switch 804 and here at least one user selectable icon 806 thereon.

While the foregoing is directed to embodiments of the present disclosure, other and further embodiments of the disclosure may be devised without departing from the basic scope thereof, and the scope thereof is determined by the claims that follow.

I claim:

1. A smart device comprising:
a processor, a memory and a display configured to:
determine that the smart device has entered a geo-fence application download trigger area;
while the smart device is within the geo-fence application download trigger area
receive a signal from the geo-fence application download trigger area indicating that an application is available to be downloaded by the smart device from a designated geo-fence location, wherein the application is only useable by the smart device within the designated geo-fence location,
determine that the smart device is authorized to download the application from the designated geo-fence location, wherein the geo-fence application download trigger area is directly adjacent to the designated geo-fence location, and
determine that the application is not stored in the smart device memory and download the application from the designated geo-fence location to the smart device;
determine that the smart device has entered the designated geo-fence location and execute the application within the designated geo-fence location;
determine that the application has completed execution and that the smart device has exited the designated geo-fence location; and
store the application in a portion of a re-writable cache of the memory having the oldest data when the oldest data is not needed for optimal operation of the smart device.

2. The smart device of claim 1, wherein, if the application is already stored in the memory of the smart device, then the processor is further configured to display an icon for the application on the display.

3. The smart device of claim 2, wherein, when the smart device exits the designated geo-fence location, the processor is further configured to:
delete the application icon from the display; and
delete the application from the memory.

4. A method of operating a smart device comprising:
determining that the smart device has entered a geo-fence application download trigger area;
while the smart device is within the geo-fence application download trigger area
receiving a signal from the geo-fence application download trigger area indicating that an application is available to be downloaded by the smart device from a designated geo-fence location, wherein the application is only useable by the smart device within the designated geo-fence location;
determining that the smart device is authorized to download the application from the designated geo-fence location, wherein the geo-fence application download trigger area is directly adjacent to the designated geo-fence location; and
determining that the application is not stored in the smart device memory and downloading the application from the designated geo-fence location;
determining that the smart device has entered the designated geo-fence location and executing the application within the designated geo-fence location;
determining that the application has completed execution and that the smart device has exited the designated geo-fence location; and
storing the application in a portion of a re-writable cache of the memory having the oldest data when the oldest data is not needed for optimal operation of the smart device.

5. The method of claim 4, further comprising displaying an icon for the downloaded application program on a display of the smart device.

6. The method of claim 5, wherein, when the smart device exits the designated geo-fence location, a processor of the smart device is configured to delete the application icon from the display and delete the application from the memory.

7. A smart device comprising:
   a processor, a memory, a camera and a display, wherein the processor is configured to:
   capture, using the camera, a first image, wherein the first image includes an object and at least a portion of the body of an individual owner of the object within a scene;
   receive, from the camera, the first image;
   detect, from the first image received from the camera, that the object is obstructing a part of the at least the portion of the body of the individual owner in the image;
   determine that the individual owner of the object permits virtual removal of the obstructing object in the image by the smart device;
   determine that the smart device has access to the individual owner's visual data;
   overlay a second image of the part of the at least the portion of the body of the individual owner of the object on top of the obstructing object resulting in an unobstructed image of the individual owner of the object, wherein the second image is generated using artificial intelligence based on the individual owner's visual data;
   blend the unobstructed image of the individual owner of the object into the scene of the first image; and
   display the blended first image on the display.

8. A smart device comprising:
   a processor, a memory, a camera, a display, and a gaze tracker configured to obtain information about the viewing direction of an individual user viewing an image on the display, wherein the processor is configured to:
   receive inputs from the gaze tracker about the direction of view of the user's eyes within a field of view of an image received by the camera and displayed on the display, and thereby determine what the user is viewing in the image and where, within the image, the user is viewing;
   store in the memory data about what the user is viewing, and where the user is viewing;
   based on the data stored in the memory about what the user is viewing, and where the user is viewing, and preferences, tendencies, and a current status of the user, predict where the user's view will next be directed;
   allocate additional computational power to the smart device based on the prediction; and
   render a plurality of graphic images on the display beginning with a location of where the prediction predicts the user's view will next be directed.

9. The smart device of claim 8, wherein the processor is further configured to:
   render a plurality of graphic images in a location on the display where the user is currently viewing when the device has no prediction of where the user's view will next be directed.

* * * * *